United States Patent [19]

Breger

[11] Patent Number: 4,972,329
[45] Date of Patent: Nov. 20, 1990

[54] SYSTEM FOR CREATING IMAGES, IN PARTICULAR DUMMIES FOR PRINTING ADVERTISING DOCUMENTS SUCH AS WRAPPERS, LABELS OR THE LIKE

[75] Inventor: Guy Breger, Rosoy Sens, France

[73] Assignee: Publigrafa, Maillot Sens, France

[21] Appl. No.: 254,920

[22] Filed: Oct. 7, 1988

Related U.S. Application Data

[63] Continuation-in-part of Ser. No. 32,680, Apr. 1, 1987, abandoned.

[30] Foreign Application Priority Data

Apr. 4, 1986 [FR] France ................... 86 04867

[51] Int. Cl.$^5$ .................... G06F 3/14; G06F 15/21
[52] U.S. Cl. .................... 364/519; 283/81; 364/521
[58] Field of Search ............ 364/518, 521, 523, 519, 364/520; 355/4, 218, 309, 46; 283/81, 94, 115; 352/87, 131

[56] References Cited

U.S. PATENT DOCUMENTS

| | | | |
|---|---|---|---|
| 2,961,920 | 11/1960 | Sachtleben | 355/46 X |
| 3,459,888 | 8/1969 | Sokolov | 355/46 X |
| 3,595,987 | 7/1971 | Viahos | 352/131 X |
| 3,747,087 | 7/1973 | Harrison et al. | 352/87 X |
| 4,722,064 | 1/1988 | Suzuki | 364/518 |
| 4,807,177 | 2/1989 | Ward | 364/900 |
| 4,813,013 | 3/1989 | Dunn | 364/521 X |
| 4,823,285 | 4/1989 | Blancato | 364/521 |

OTHER PUBLICATIONS

4957 *Series Users*, revised Nov. 1987, pp. 1-1-1-15.

Primary Examiner—Gary V. Harkcom
Assistant Examiner—H. R. Herndon
Attorney, Agent, or Firm—Pollock, VandeSande and Priddy

[57] ABSTRACT

A system for creating images for use in printing wrappers comprises a video image reader and a graphic console, a keyboard, a graphic tablet and a monitor to receive, to combine and modify image signals and colors. The system combines video and vectorial image signals and creates one picture or a series of pictures simulating a product wrapper, or a repetition of wrappers or products with such wrappers thereon.

6 Claims, 4 Drawing Sheets

SYSTEM FOR CREATING IMAGES, IN PARTICULAR DUMMIES FOR PRINTING ADVERTISING DOCUMENTS SUCH AS WRAPPERS, LABELS OR THE LIKE

BACKGROUND OF THE INVENTION

Field of the invention.

Cross reference to related application

This application is a continuation in part of applicant's prior application No. 032 680 filed Apr. 1, 1987, now abandoned for "System for creating images, in particular dummies for printing advertising documents such as wrappers, labels or the like".

The present invention concerns a system for creating images, in particular dummies for printing advertising documents such as wrappers, labels or the Description of the prior art.

At the present time, the creation of an advertising document such as a wrapper or a label represents a relatively complicated piece of work which involves the intervention of a number of specialists.

First of all, a graphic artist is required to produce a dummy which approaches to a greater or lesser degree the product in its definitive form. The graphic artist combines various items of information such as text, drawings and a background. As the graphic artist cannot simultaneously have qualities of an illustrator, a letterer, etc., his dummy will give a good idea of the final product in regard to the parts in which the graphic artist excels whereas the other parts will be of medium quality. It is therefore difficult to have a relatively accurate impression of the final product.

In order to get closer to the finished item, it is necessary to go to the stage of photogravure. The photogravurist is required to interpret the draft supplied to him by the graphic artist. The photogravurist does not always have precise information from the graphic artist. Such information may concern the positioning of the various elements making up the dummy, the nature of the lines or the graphics, etc., and colors. Accordingly, a number of drafts have to go back and forth between the graphic artist, the illustrator, and the compositor, until a draft which is suitable for printing has been established. That draft is then submitted to the advertising man and/or the client, who may want modifications to be made.

Now, in order to deal with such modifications, it is necessary to go again through the various stages set forth above.

The dummy produced is then prepared for printing. That involves manually redrawing completely and in faircopy form, and assembling the different elements of the black-and-white document comprising all the items of text and the illustrations in monochrome line form. The color illustrations are produced by means of a very wide range of processes: air-brush, pastels, gouache, etc., and the film shooting instructions are prepared, for producing Ektachromes.

All those operations require the intervention and coordination of different highly specialized operators. Such human operations have to be carried out by very carefully following different long and expensive steps that are incompatible with the due dates and budgets which were initially specified.

The above-mentioned different operations take a great deal of time, which is prejudicial to the rapid production of advertising or other dummies.

SUMMARY OF THE INVENTION

The object of the present invention is to provide a means for creating dummies and graphic films necessary for printing on wrapper materials of graphic films for photogravure printing, which immediately provides a definitive image of the dummy, simplifying the human intervention involved and making creation of the image independent of the artistic skill of the operator, to permit the qualities of the dummy to be judged straightaway.

A general object of the invention is to computerize the series of operations involved in the process for creating and preparing the printing on wrappers of products which are consumed in large amounts, involved in the packaging field.

For that purpose, the invention concerns a system for creating images, in particular dummies for printing advertising documents such as wrappers, labels, etc., (hereinafter referred to generally as "wrappers") the system being characterized in that it comprises:

at least one video-process image reading device, at least one graphics console having a control keyboard, a graphic tablet and a monitor screen and a computer for controlling the console, ruled-screening means, means for printing the image of a wrapper on carriers, the computer for controlling the graphics console being programmed to combine the video images of the image reading means and the vectorial images of the graphic tablet.

The system makes it possible easily to receive any existing image of the wrapper for working with that image, combining it with other existing images which are also introduced into the system, to take extracts thereof, to modify the scale, cutting-out, contrast and colors, to insert inscription and geometrical figures, effect shifts, rotations, translation of a part or the whole of the image, etc..

The above-indicated transformation and combination operations are carried out just by the graphic artist who does not have to have qualities as an illustrator, letterer, etc., since all those items of information exist in the machine and can be selected by means of the graphics console or can be introduced by the reading scanning means (or reading means) or the video camera or the graphic tablet.

The graphic artist immediately sees the result of his treatment either on the screen of the monitor of the graphics console or by printing or shooting a film on the spot by means of the printer or the reproduction scanning means (or reproduction means).

By virtue of that system, the advertising man and the client can immediately examine a clear dummy of a wrapper which is close to the definitive print both in regard to form and in regard to colors. The modifications desired can be immediately decided upon and made in the dummy.

In addition, it is possible to multiply the image of a wrapper on the screen in order to obtain a mass effect similar to the effect produced by a plurality of such wrappers disposed on sales shelves.

It is also possible to inscribe the dummy in the different outlines of the wrappers of the range of products for which the dummy is intended.

The elements visualized by the graphic artist are sufficiently well defined to be used as they are for producing execution documents, test ozalids and photogravure films.

BRIEF DESCRIPTION OF THE DRAWING

The present invention will be described in greater detail by reference to an embodiment of a system for creating wrapper images, which is shown in diagrammatic form in the accompanying figures.

FIG. 2 comprising

FIG. 3, comprising

FIG. 4, comprising

DESCRIPTION OF THE PREFERRED EMBODIMENTS

Figure 1:
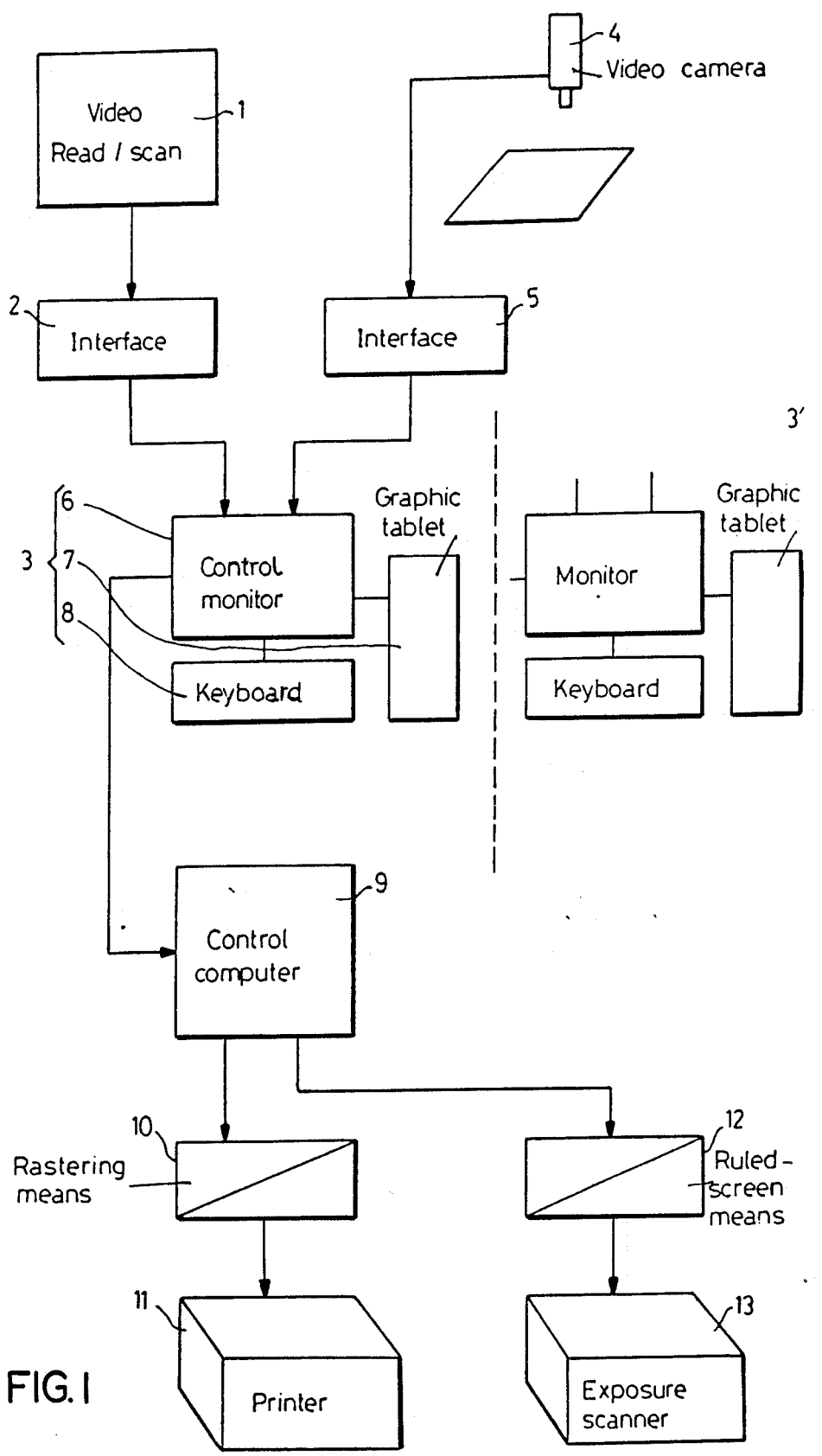
FIG. 1 is a diagrammatic view of the system of the invention.

Broadly speaking, the process of the invention comprises creation, that is to say the search for a certain number of of a wrapper 'directions' of study, which are embodied by drawings with an indication of color, choice as among such directions, execution of a precise drawing and a dummy, and the production of the execution documents, the strict definitive drawings with indication of colors and the films (one per color) required for the production of material printing supports (plates in offset printing and rolls in photogravure).

(1) CREATION

* Starting from ideas and (or) existing documents, a certain number of draft wrappers are produced by means of drawings. * Data processing makes it possible to manipulate images of the wrapper on a screen:
    starting from the introduction into a memory of initial document (input) or direct creation of an initial image on the screen;
    with the production (at the output) of one or more images, first in the memory and then in printed form to proceed to study them.
    Manipulation of images:
* Direct creation of the color image of a wrapper on the screen and manipulation thereof are effected by image processing software, by means of a computer having a screen, a graphic tablet and a disc memory.

The originality of the software according to the invention lies in its capacity to vectorize the plottings, which permits:
    highly elaborate image manipulation,
    to obtain a strict geometrical plotting,
    to limit the volume of the memorized data, and
    to be able to restore the plotting at the printing output without a loss of accuracy, the latter being solely dependent on the degree of resolution of the printing equipment.

It permits all the manipulation operations required and a wide choice of colors (16 million).

Input

The input used to create an initial document is effected by:
    a scanner which memorizes the image of a wrapper on a magnetic support which is then read by the computer for processing the image, which displays it on the screen, and
    a camera with direct display on the screen with a lower level of resolution.

That display is effected using points or dots. It is therefore desirable for the software automatically to convert the image which is introduced in that way into vectorized language to manipulate it with the maximum degree of rapidity.

It restores colors so as to avoid a spurious time for producing colors, the operator being required only to effect a simple modification of the colors in the course of the manipulation operation.

Output:

1 - At the creation stage, the output is one or more documents which permit the draft of a wrapper to be brought into being and to establish a dummy of natural size and volume.

2 - The reproduction of colors is effected by using a table of concordance between the screen color chart and the chart of the output units.

3 - The documents outputted must serve directly to establish the dummy for the wrapper.

That implies that the documents can be established:
    in the necessary format
    on a support of the same type as that used for the wrapper.

The supports to be used must be capable of being:
    paper
    plastic sheets
    metallized composite materials.

4 - By virtue of vectorization of the images and precise coloration thereof, finalization is integrated in the creation operation without the necessity for picking up the image again, as in the manual process.

That is a considerable time saving.

5 - The output document is produced:
    either by a scanner and optionally an associated printing device, which gives a high-quality reproduction,
    or using an ink jet printer (laser or thermal . . . )

Those items of equipment may be directly connected to the computer or may come into operation using a cassette on which the images have been previously memorized.

They rasterize the vector images (that is to say they convert them into images using dots or points).

After acceptance of the dummy wrapper, definitive output is effected on a cassette for carrying out the production stage of the wrapper. It stores the wrapper image in vectorized language.

(2) PRODUCTION—Execution documents:

After the dummy to be used has been definitively chosen, documents are produced that are only the repeat of those obtained at the output of the creation step, but:
    on a paper support or tracing, in monochrome and in the precise format,
    with additional indications of colors which are highly precise for the printing operation.

The color documents can be obtained from monochrome films by means of auxiliary proof printing equipment or by means of a printer.

The execution documents are the last proof prior to production of the printing forms.

Establishing the films:

The films required for engraving of the rolls or printing forms are established directly by the exposure scanner on the basis of the memorized definitive image of the precise format and color by color.

The computer, firstly by means of suitable software, effects ruled-screening of the image, with a special processor.

Referring to FIG. 1 of the drawings, the system for creating images, in particular dummies for printing of advertising documents such as wrappers, labels, etc ..., is composed of a reading scanning means 1 connected by way of an interface 2 to a graphics console 3. Disposed in parallel with the means 1 is another video-process image reading device formed by a video camera 4 which is also connected to the graphics console 3 by an interface 5.

The graphics console 3 is composed of a control monitor 6, a graphics tablet 7 and a keyboard 8.

The system may in fact comprise a plurality of graphics consoles 3', etc., which are connected in parallel with the graphics console 3 between the image reading devices 1, 4 and the downstream parts of the system.

The graphics console 3 is connected to a control computer 9 which provides for control of the graphics console to combine the items of video information supplied by the reading devices 1 and 4, and the items of vectorial information supplied by the graphic tablet 7. The program of the computer 9 combines those different signals to restore items of information intended for the production of the dummy.

Downstream of the computer 9, the system comprises a rastering means 10 connected to a printer 11 which makes it possible to provide a printed copy of the dummy prepared on the graphics console 3.

Also provided in parallel with the printer 11 is an exposure scanning means 13 connected to the computer 9 by a ruled-screening means 12. The means 13 makes it possible to produce the film serving for the engraving or other operation.

The scanner 1 and the video camera 4 permit numerical images to be introduced into the system.

Such images are positioned and displayed as soon as they are introduced into the system and then can be modified immediately from the graphics console by means of simple instructions.

In more detail, the reading scanner 1 may be a line scanner, a monochrome scanner or a precision polychrome scanner which reads the original document dot by dot in accordance with a grid which comprises a grid mesh, a line system and a definition. Each dot is of a dimension which characterizes the quality of the operation of digitization. The dot or pixel is of a usual dimension of $10 \times 10$ microns, more rarely $5 \times 5$ microns.

The document is virtually divided in accordance with a line system which permits the dots being considered to be coordinated; the continuous image of the line document is broken up into dots.

Conversion of the 'dot' or 'pixel' image is subject to the same conversion operations as the image from the video camera 4 but the result obtained is of much better quality: the reading scanner 1 has a definition of 2000 to 4000 dots/cm, its reading format exceeds $800 \times 800$ mm but its working speed is linked to dot-by-dot reading, in a moving mode, that is to say in the preceding case, over a period of 15 minutes.

The smoothing operation may be effected with a tolerance of a few microns and the image obtained is very faithful to the original. If a half-tone monochrome scanner is used, it analyzes the document generally in a flat condition, contrary to the above-discussed line scanner which uses an analysis drum. The analysis cell no longer functions on the basis of an all-or-nothing binary system but comprises a microdensitometer which gives analog information which will be numbered according to the curve of the grey values.

A level of the greys corresponds to each point or dot; the greater the number of dots defining that curve, the more the curve is precise and regular, without any interruption.

That type of image using 'dots' or 'pixels' cannot be vectorized at the present time and, according to the invention, it is used as it stands by limiting the manipulation operations, without ever mixing them with vectorial images.

The analysis principle of the half-tone polychrome scanner may be explained in terms of the monochrome scanner if the incident light beam is broken down into three monochrome beams with the interposition of chromatic filters with a corresponding pass band giving information corresponding to the three primary printing colors. Black is obtained on the basis of that triple analysis.

The process according to the invention makes it possible to modify the colorimetric parametering. It is not limited to the four colors referred to as 'primary', but it provides for a selection of colors with references 'PMS' or Pantone.

That possibility is of major importance for wrapper printing which is a mixture of illustrations, colored tints and texts, in which priority is given to the quality of such colored tints.

The video camera 4, which is for example a high-definition camera, introduces real images in real time, with the minimum of manual intervention.

Those analysis dots are allocated the three primary colors. Thus a color image will be formed by a maximum of $12 \times 10^6$ items of information.

Those images are 'roughs' for a large format. An image format of more than $10 \times 10$ cm cannot be recommended except for summary positioning of images which will be subsequently re-worked.

As videos images are different in nature from mathematical images, in order to mix them and manipulate them with the same degree of facility, they have to be converted into mathematical images. For that purpose the process according to the invention comprises converting by vectorization the items of information constituting a color video line image very easily into three monochrome images which are successively processed.

Vectorisation of a monochrome video image:

A monochrome video image is an assembly of points or dots (pixels) ($2000 \times 2000$ maximum per image) which are converted by two software levels.

First conversion:

The edges of the drawing are indented by the assembly of dots which are created by the video camera.

The edges of each assembly of dots is converted by software into a contour line composed of an assembly of vectors. To vectorize, a curve is replaced by a sequence of straight line segments. An elementary length of such segments is defined.

That operation, which is sometimes slow, may be dealt with outside the working hours of the operators.

That number of vectors will be considerable; the edges of the image are not regular; that vectorial image is therefore subjected to a second conversion operation.

Second conversion: smoothing

In dependence on his objectives and the result obtained, the operator provides for simplification of the assembly of said vectors by restricting the number of vectors.

By arranging a tolerance in respect of the path of the future line while scanning around the first contour line, it will be possible to reduce the number of vectors used by replacing them with vectorial functions which will reduce the number of instructions.

The greater the tolerance, the greater the reduction in the number of instructions, but the contour defined in that way will depart from the real original drawing.

Vectorization of a degraded monochrome image:

(1) Iso-densitometric method:

The digitized degraded image comprises two items of information: The coordinates of each point with which there is an associated grey value (measured by densitometry).

Determination of the iso-densitometric curves:

The continuous grey values are divided into a defined number of ranges of grey. That number is often fixed at 256. The grey values between two given values are enclosed by a curve.

Modelization of the hidden zones:

Those zones will be drawn by means of their contours and the characteristics of filling thereof with representation priorities.

Determination of the grey values:

By increasing the number of reference grey values, the iso-densitometric curves are multiplied and an image which comes ever closer to the initial image is obtained.

The latter operation is controlled by the operator who adapts the number of iso-densitometric curves to the desired results and to the initial That method uses a number of calculations which is sometimes considerable, depending on the desired quality of the image. That method is slow and often will have to be processed outside the working times of the operators.

(2) Fractals method:

In this method, the assembly of dots with which their grey value is associated is replaced by polygons. That polygon will be repeated in accordance with a recursive mathematical function.

Each polygon which represents a group of dots is defined mathematically by segments (a length and an angle), a scale factor and an orientation.

First conversion or 'fractalization'. By means of software, the depth of the recursion is fixed and a first image which is converted into 'fractals' is obtained. That operation is performed at the order of the operator, as a simple menu function.

Second conversion or smoothing of the surfaces.

The first modification of the image involves a large number of polygons with sharp edges.

Smoothing of the edges gives surfaces with smooth contours and the number of recursions is limited to the minimum required to give the image a good appearance.

The operator will fix the number of recursions which are compatible with the desired result.

Those operations are sufficiently fast to be inter-reactive.

The graphics image console 3 makes it possible to choose this or that part of the items of information which are thus introduced into the system by the means 1 or 4 in order to choose the whole or a part thereof, by increasing, reducing or retaining the scale, or any other image centering operation. Those images constitute for example the background of the dummy to be produced, or particular forms, for example for filling contours or outlines obtained by means of the graphic tablet.

The graphics console 3 also permits the introduction of conceptual or vectorial images into the system. The operation of laying out those images is effected by virtue of the choice of the geometrical figure or the like among the various options in the system; the dimensions and positioning of the figure are effected on operator instructions.

The same applies in regard to the choice of colors, filling of the contours or outlines or the surface outside the contours or outlines, etc.

Selection of the figures, the shape thereof and the dimensions of the figures as well as filling of the area defined by the contour of outline which is external thereto by means of a color are effected by means of the reading pen of the graphic tablet 7.

In fact, the operator chooses a geometrical figure such as for example a circle, a quadrilateral etc., and then, on the drawing, he selects points through which he wants that geometrical figure to pass and, by means of the keyboard 8, he controls execution of those instructions, that is to say, the plotting of that geometrical figure by way of the selected points.

If appropriate, the operator filler of the area delimited by that figure or the area which is complementary thereto, that is to say which is external threto, with a color. For that purpose, he first chooses the area by pointing thereto and then he introduces the information by way of the keyboard 8 and controls execution thereof.

He then chooses the color by pointing to the desired color on a palette and then pointing to the previously chosen area, and finally causes that instruction to be executed.

The orders are given by means of the electronic pen and the graphic table except for the items of information relating to dimensions and text.

Display and mixing of the images are permanently monitored on the monitor 6.

When a dummy has been produced, the user can control the production of a complete range of wrappers or labels, depending on the products which are being wrapped or which are to be treated therewith. He can thus form an entire range of wrappers in order to ascertain the overall effect. He could also repeat the packaged products in order to evaluate the mass effect of such a wrapper. Finally he can compare its mass effect, in relation to competing packagings. The competing packagings in question may be easily introduced into the system for example by means of the video camera 4 which photographs the packaging of a competing product.

Depending on the results of that examination operation, the user will be able to modify the dummy, immediately taking account of the defects which he may have noted and he will be able to cause the fresh dummy to appear straightaway.

By means of the printer 11 or the exposure means 13, the system makes it possible to produce images on an opaque or transparent carrier (paper, film, etc ...) in a high state of finish resulting solely from the reading devices 1 and 4 and transformation, cutting-out and insertion operations which are effected at the graphic image console 3.

It is possible to use two types of output printers 11:

High-definition monochrome printers

To produce the model of a photographic image with a limited number of printing inks, the printing forms comprise dots of variable dimension. The size of those dots and the number thereof define the quality of an image.

The distance between the centers of the dots characterize the line system; the grid formed by the lines joining the centers of each dot constitue a network referred to as a screen.

Each dot is formed around its center by a pencil of light which strikes a silver film creating a latent image. The pencil of light is of a variable dimension by programmed focussing but it may not be less than a minimum which nowadays is fixed at $5 \times 5$ microns. The successive combinations of that elementary point which is corrected by programmable defocussing causes the variation in the size of the dot.

Figure 2A:
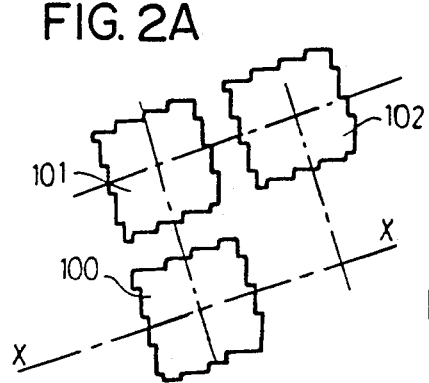
FIGS. 2A and 2B shows two orientations of screen points.
Figure 2B:
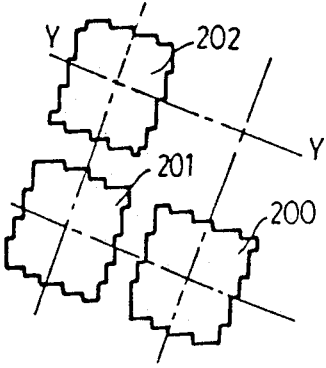

In order to avoid moiré phenomena in polychrome printing, imposed on the different line screens are particular angulations which, as shown by the accompanying drawings, slightly deform the dot (FIGS. 2A and 2B).

FIG. 2A shows as an example 3 dots 100, 101, 102 with an orientation according the direction XX.

Figure 3A:
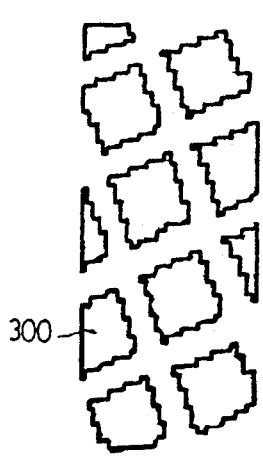
FIGS. 3A, 3B and 3C, shows the known variation in respect of the screen points.
Figure 3B:
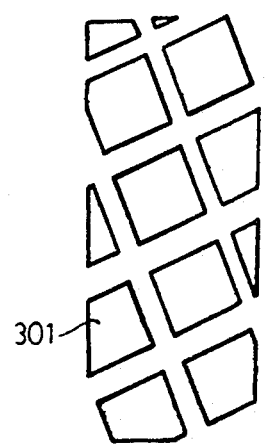

FIG. 3B shows as an example, 3 dots 200, 201, 202 orientated according to the direction YY.

In accordance with the invention the light printing scanner is programmed so that the ruledscreened surfaces comprise on their edge a contour line which improves the definition of an edge which will no longer be notched by the screen dots: the contour line will be of a minimum value determined by the minimum dimension of the pencil of light of the exposure source.

Particular ruled-screening software permits that operation to be performed.

FIG. 3 (3A, 3B and 3C) show the variation in the dots of a screen between the ruled-screened dots with notched contour, the assembly of which corresponds to a rectangular surface after exposure of the film (FIG. 3A).

The dots 300 appear on the film with a serrated outline as shown in FIG. 3.

The film used for the engraving operation gives an engraved matrix, the square dots 301 of which are no longer of a notched shape (FIG. 3B).

Figure 3C:
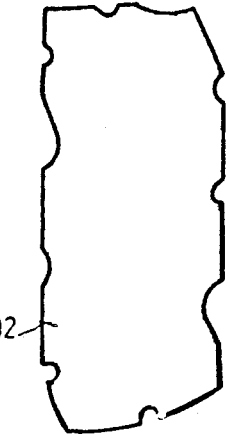

When the engraved matrix is used for the printing operation, it gives a printing line which is shown in FIG. 3C: the contour of the rectangular area 302 is notched whereas within the contour the printing is uniform (FIG. 3C).

Figure 4A:
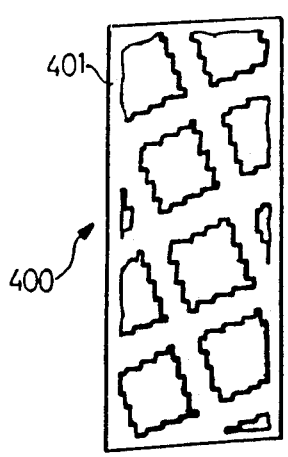
FIGS. 4A, 4B and 4C, shows the variation in the screen points according to the invention.
Figure 4B:
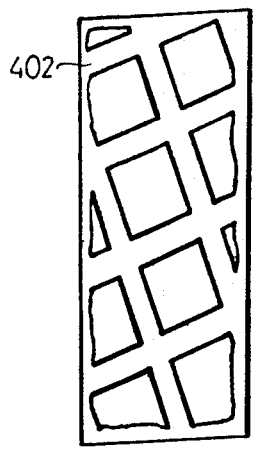
Figure 4C:
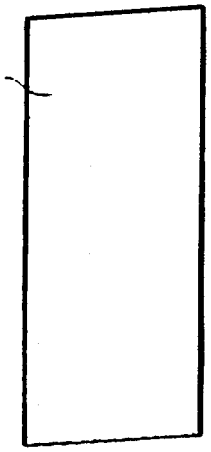

In accordance with the process of the invention (FIG. 4), the rectangular area 400 which is at the same time surrounded by a contour line 401 on the film (FIG. 4A). The line is reproduced in the engraving 402 (FIG. 4B) so that in the printing operation, a perfectly rectangular contour 403 is obtained (FIG. 4C). It is obvious that the rectangular shape selected here is only a simple example.

Polychrome printers

Present polychrome printers use primary colors which are complementary to those of the color monitor; they are therefore considered as outputs for copying the screen.

Their image definition however is much better than that of any color monitor, but is limited to 300 lines per inch.

In order to improve the image rendering, the image is processed as for the preceding monochrome printer but limiting the different tonalities possible in each primary color.

The image quality is not that of printing but it is nonetheless highly presentable and gives an image which very well expresses in concrete form the work performed upstream (synthesis images and real images converted into dots).

The definition and the quality of the images produced by the devices 11 and 13 are at least equal to those of the best present-day products such as:
dummies of wrappers,
black-and-white production documents,
checking proofs in black-and-white or color form,
positive or negative graphic films which are ready or for use by the engraver or the copier.

The graphic films may be produced in accordance with the standards of flexographic printers, and photogravure printers, screen printers, typographic and offset printers in order to satisfy all the needs of wrapper printers.

The software of the system makes it possible to carry out, in addition to the usual work, operations that increase the fineness and the quality of the images, in particular by means of a treatment of particular features, such as line images or half-tone images in autotype photogravure.

(A) Line images

To provide the substantial ink flow rates in of flat tints, use is made of ruled screens with a low level of ruling, and for fine texts or graphics the emphasis is put on the definition capability of screens with a high level of ruling.

According to the invention it will be possible to use screens with different rulings on the same film.

Depending on the behavior of the ink on the carrier (absorption, spreading, opacity ...), the procedure involves using engraving recesses which are adapted to the final use of the engraved cylinder.

By experience, it is known that the engraving "bridge" must necessarily be between 15 and 20 microns after engraving, irrespective of the recess desired.

In consequence, the engraving film must comprise fixed, constant inter-point distances which are related to the recesses of the desired engraving, to the engraving time and to lateral engraving which accompanies principal engraving, independently of the selected ruling or rulings.

At the present time, six screen rulings are used, in decreasing order as follows:

| | |
|---|---|
| 6 | 1/m n |
| 7 | 1/m n |
| 4 | 1/m n |

| | |
|---|---|
| 8 | l/m n |
| 9 | l/m n |
| 0.6 | l/m n |

The invention makes it possible to improve the definition of the image. Indeed, at the present time every line image in photo-gravure printing is subjected to ruled screening. Upon printing, the edges thereof necessarily have the "scalloping" or "denticulation" effects of the screen, which reduce the definition of the line image.

A thread which encircles the line image (thickness of an elementary point=pel) at the spacing of a pel enhances the definition of the image.

In addition, it is found that, with a constant inter-point value, the bridges between recesses after engraving are stronger in the center of the flat tints that in the edges.

In order to compensate for that effect, the invention systematically increases over a given number of rows of points, the interpoint by an adjustable value.

The use of the foregoing options makes it possible to limit the use of screens with different rulings.

Finally, contrary to the custom in the trade whereby the line screens are oriented at 45° with respect to the generatrix of the future cylinder, the invention makes it possible to operate parallel to that generatrix.

(B) Half-tone image in autotype photogravure

In such an image, a distinction is made between three parts:

the dark or shade parts
the highlights
the intermediate zone.

In the darkest part of an illustration (dark or shaded parts), the value of the inter-point distance is fixed in regard to the engraving recess which is determined (like the line).

In the high-light parts of the image, the first printable density is provided by a point of 10×10 microns, that is to say on the film 1 pel×1 pel.

The printed image improves in proportion to increasing printed image contrast.

The best result was obtained by using a double-ruling screen:

| | |
|---|---|
| high level of ruling in the high lights | 6 l/m n |
| low level of ruling in the dark or shaded parts | 5 l/m n (for example) |

The image of that double ruling makes it possible to produce a smaller break in the reproduction curve at about 50%: an image is clearer as it has greater contrast.

Thus, to sum up, the invention transforms real line images into pixels and then into vector form for them to be manipulated as desired while real halftone images will be transformed into pixels; they are subjected to very little manipulation and are superposed (different plane) on the graphic vectorial images.

They follow a path which is parallel to the vectorial images, without mixing, and are associated only before ruled-screening by a special software on a particular computer.

Figure 5:
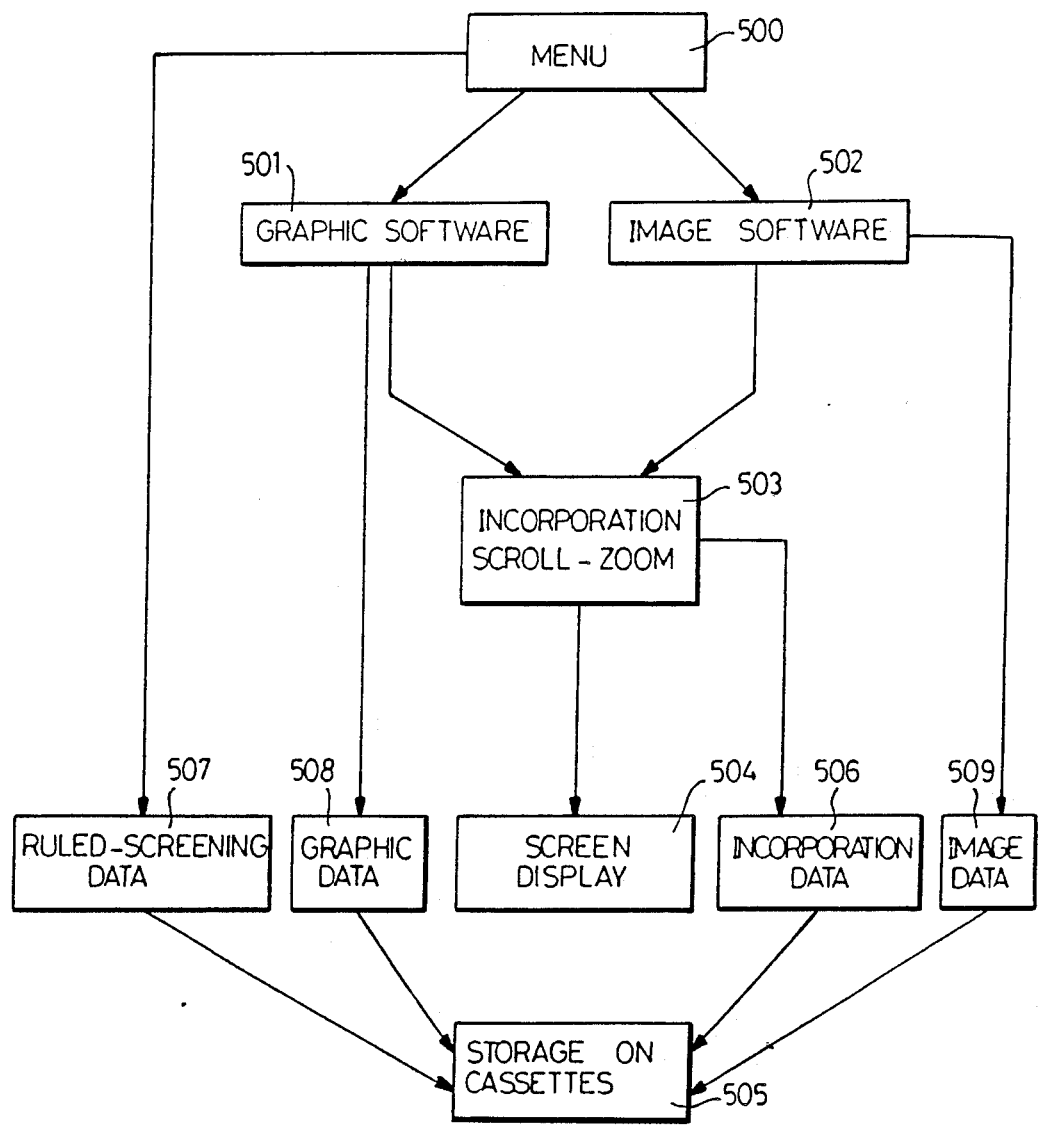
FIG. 5 diagrammatically shows the organization of the software used in the invention.

For carrying it into effect the invention uses different software packages which were created for the present application. FIG. 5 gives an overall diagrammatic view of the image manipulation software packages.

The menu 500 comprises graphic software 501 or image software 502 the use of which gives scrollzoom incorporation 503. Then the results may be displayed (screen display 504) or data may be incorporated (506) for storage on cassettes 505.

The menu 500 comprises also ruled-screening data 507. The graphic data 508 from the graphic software are stored on cassettes 505 as well as image date 509 from the image software 502.

Graphic software

In order best to meet the requirements involved and to achieve the necessary qualities in respect of interactivity, the structure of the graphic software offers the following different aspects:

Geometric aspect
Functional aspect
Structural aspect

The requirements in respect of speed and power of the possibilities involved are often contradictory, however it is possible to produce an optimum software structure by using a segmented hierarchy.

A segmented hierarchy is a structure in which different processes are managed in a pipe-line.

image class of segments segment

The advantage of such a structural hierarchy is that it is capable of simply supplying an interactive object software, namely a branched structure of menus.

In accordance with the process of the invention, current means such as rules, square, compass and protractor, were simulated in a geometric editor referred to as a contextual.

The notion of context is highly important as it permits at a given moment the definition of geometrical elements with respect to those already defined.

The invention distinguishes between three types of geometrical elements:

| |
|---|
| elements of measurements: |
| *angle |
| *length |
| geometrical elements: |
| *arc |
| *lines |
| *circles |
| *points |
| *rectangles |
| qualitative elements: |
| *middle |
| *center |
| *same length as |
| *same angle as |

The user communicates his desires to the system by means of 'stand by' functions which can therefore be called up at any moment on the tablet 7, in respect to the following functions:

horizontal displacement only,
vertical displacement only.

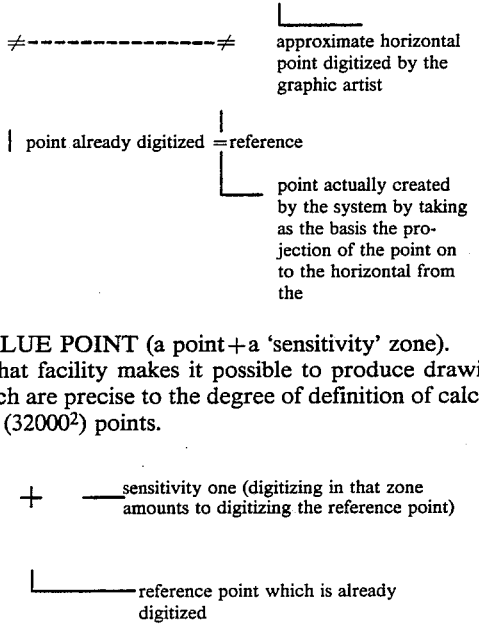

GLUE POINT (a point+a 'sensitivity' zone).

That facility makes it possible to produce drawings which are precise to the degree of definition of calculation ($32000^2$) points.

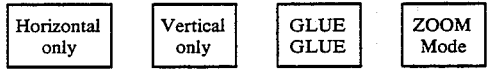

it is also necessary at any moment to be able to zoom the working zone.

Zoom must permit: rapid display in another definition and deformation (circle, ellipse).

The invention provides independent zoom in respect of X and Y.

Summary of the 'stand by' functions

| Horizontal only | Vertical only | GLUE GLUE | ZOOM Mode |

Geometrical aspect

The characteristics of the geometrical edition software (GEOMOD) are as follows:

| FUNCTIONS | Comments |
|---|---|
| GEOMOD (Menu 1) | Title: GEOGEN |
| 1.1. POINTS | |
| 1.2. LINE | |
| 1.3. CIRCLE | |
| 1.4. ARC | |
| 1.5. RECTANGLE | |
| 1.6. GRID | element to be associated with the GLUE points to create reference grids, on the basis of which digitization will be facilitated. |
| 1.7. DIVISER | effects division by points of geometrical elements |
| 1.8. INIT | initialization of the geometrical mode. |
| GEOMOD (Menu 2) | Title: GEOPNT (point) |
| 2.1. Coordinates | the user interrogates the system on the (x, y) of a point |
| 2.2 Coordinates | point = coordinates tapped in on the keyboard |
| 2.3. Marker | point = duplication |
| 2.4. Line + line | intersection of two lines |
| 2.5. Line + circle | intersection of line and circle |
| 2.6. On line | one line and one point approximately are given |
| 2.7. ½ line | one line is given, the middle is received |
| 2.8. Center | gives the central point of elements other than those defined in GEOMOD |
| 2.9. Inter circle | intersection of circles |
| GEOMOD (Menu 3) | Title: GEOLIN (lines) |
| 3.1. Marker | two external points are given |
| 3.2. Horizontal | one point is given |
| 3.3. Vertical | one point is given |
| 3.4. Point + angle | one point and an angle are given (see GEOANG) |
| 3.5. Parallel to | one line + one point are given |
| 3.6. Perpendicular to | one line + one point are given |
| 3.7. T4 1- circle | |
| 3.8. T4 2- circle | |
| 3.9. | |
| GEOMOD (Menu 4) | Title: GEOCER (circles) |
| 4.1 Center + radius | |
| 4.2. Point + length | |
| 4.3. ∅ | Diameter |
| 4.4. 3 points | Three points are given, the system creates the circle passing through the three points |
| GEOMOD (Menu 5) | Title: GEOARC (arcs) |
| 5.1. Center + 2 points | |
| 5.2. ½ circle | |
| 5.3. 3 points | |
| 5.4. Bend | |
| GEOMOD (Menu 6) | Title: GEOGRI (grids) |
| 6.1. Rectangular grids | |
| 6.2. Polar grids | |
| GEOMOD (Menu 7) (elements of) | Title: GEOANG (definition of angles) |
| 7.1. Enter % | 360° = 100% |
| 7.2. Enter degrees | |
| 7.3. ? angle | three points are given, the value of the angle of ° is obtained, which is transmitted to the sequence of programs. |
| GEOMOD (Menu 8) (elements of measurement) | Title: GEOLON (definition of lengths) |
| 8.1. Marking | Two points are given GEOMOD returns the |
| 8.2. Length X | |
| 8.3. Length Y | |
| 8.4. Keyboard | enter a length at the keyboard |
| 8.5. Same as (L) | Length = a length of a line which already exists, where the line just points |
| GEOMOD (Menu 9) | Title: GEODIV (utilities of divisons) (Appendix 2) |

This function creates points representative of divisions; those points can then be used by all the other functions and also with the utility GOEGLV

| | |
|---|---|
| 9.1. Line division | |
| 9.2. Line carry | |
| 9.3. Divide circle | |
| 9.4. Divide circle incrementally | |
| 9.5. Divide arc | |
| 9.6. Divide markers | |

-continued

| GEOMOD (Menu 10) Title: GEOREC (rectangles) |
|---|
| 10.1. 2 points |
| 10.2. Point + 2 lengths |
| 10.3. Square |

Functional aspect

The different menus (GEOMOD) are consolidated in an even more general menu which deals with complete management of the branching and involves options of manipulation of the above-listed entities (segment+-group+classes).

The hierarchical rules which are going to apply to structuration are as follows:

Segment: a segment is the smallest hierarchical entity of the software, it can be edited, namely it makes it possible to change the following:
- size
- orientation
- shape
- color
- surface area Class: a class is an assembly of segments; that entity is static and is stored (up to 66); there are a number of possibilities for consolidating the segments in classes:
- in colors
- in texts
- in rectangles
- exclude 1 segment
- add 1 segment Group: a group is a class at a given instant, it is therefore a dynamic entity, and effecting conversion operations always involves a step:

class ⟶ group

Files: once an image is created by that structure, it has to be stored in a compact fashion, in such a way as to reduce for example the costs of transmission of coding of the image.

The files are coded in structured fashion:

$$\text{File image} = \begin{pmatrix} \text{colors table + index table} \\ \text{display - list (coded} \rightarrow \text{definition } \infty) \end{pmatrix}$$

the table of colors codes the colors of the image the index table governs priorities in respect of display of segments (overlapping)

the display list is the location for storage of graphic elements; thus for example a text is coded with its own justification, characters, color, etc . . .

Structural aspect

Figure 6:
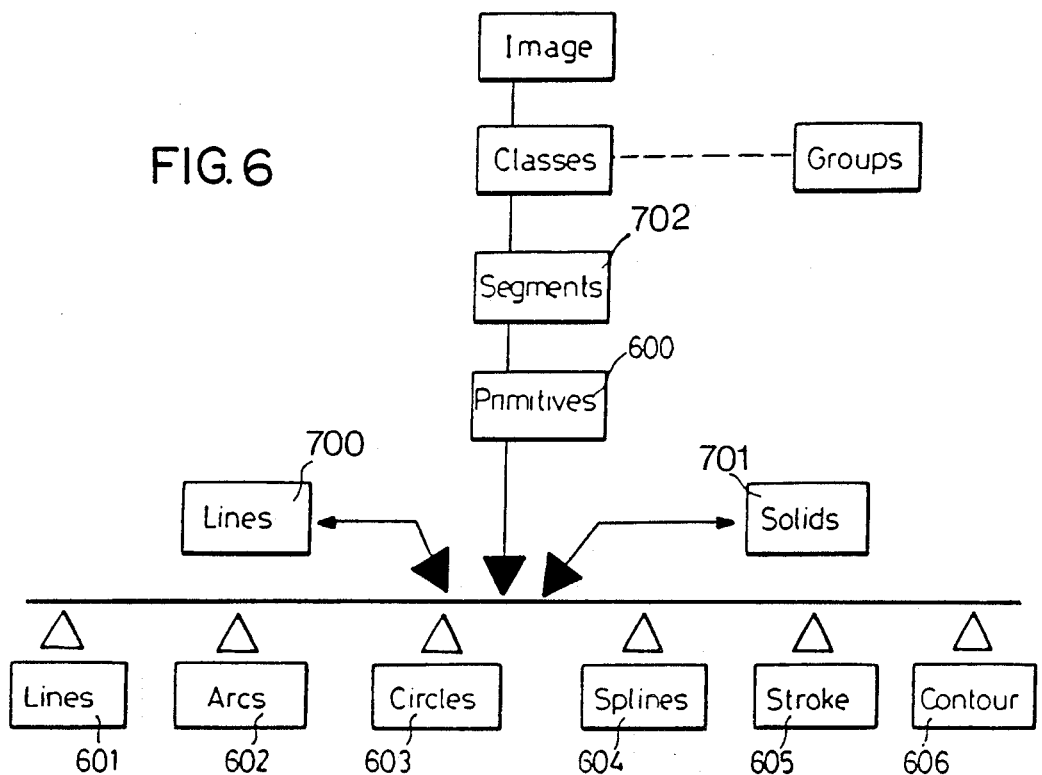
FIG. 6 shows the structure of the graphic software according to the invention.

In accordance with the structural aspect of the program the different hierarchies which are arranged in accordance with the 'hierarchical' layout in FIG. 6 are analysed as follows:

In a first period, only branching downstream of the image is managed.

(A) Primitives: the creation primitives 600 will be as follows:
- lines 601 (which may or may not be constrained)
- arcs 602 (those defined in GEOMOD)
- circles 603 (those defined in GOEMOD)
- splines 604 continuous smooth curves interpolating an assembly of points to form a curve
- stroke 605: 'continuous' drawing of line drawing type
- contour 606: makes it possible to jump a contour, that is to say to be able to define holes within graphic objects.

(B) Solid/lines

Two types of figures can be created:
- lines (thick contours) 700
- solids (or color tints) 701

Conversion into those two types is always possible, at any moment whatever.

(C) Segments 702

A segment is the elementary entity. The menus relating to the creation of a segment by juxtaposition of primitives will be detailed hereinafter.

| SEGMENT (Menu 1) Title SEGORE (segment creation) |  |
|---|---|
| 1.1. lines | |
| → | involves GEOLON for thickness choice |
| 1.2. Solids | |
| SEGMENT (menu 2) Title SEGCOL (segment color) | |
| 2.1. Number | |
| 2.2. Color Menu | |
| 2.3. Marker | |

The same contextuality characteristics are sought here as those developed in GEOMOD, namely: 2.3. authorizes the selection 'same color as', the colors can also be repertoried by number and by choice direct on a table of colors.

| SEGMENT (Menu 3): SEGPRM (creation by primitives) |  |
|---|---|
| 3.1. Lines | |
| 3.2. Arcs | |
| 3.3. Circles | |
| 3.4. Splines | |
| 3.5. Stroke | |
| 3.6. Contour | |
| 3.7. O GEOMOD | |
| 3.8. Point symmetries | |
| 3.9. Line symmetries | |
| SEGMENT (Menu 4): SEGVALI (segment validation) | |
| 4.1. Edit | modify the segment |
| 4.2. Create | add elements |
| 4.3. Display | |
| 4.4. Path | comment |
| 4.5. Validation | |

4.4.: this function permits the graphic artist to review the background of the segment and also to go back and to safeguard any working step.

| SEGMENT (Menu 5): Title SEGEDI (segment edition) |
|---|
| 5.1. Destroy |
| 5.2. Insert |
| 5.3. Change |
| SEGMENT (Menu 6): Title SEGKIL (destruction internal to a segment) |

The path of the segment occurs in dependence on the following:
- points which have served to create it, and
- primitives which have served to create it.

| 6.1. Advance |
| 6.2. Reverse |
| 6.3. Action |

-continued

| 6.4. Unchange |

For the destruction of points, identification thereof is effected directly on digitization.

| SEGMENT (Menu 7): Title SEGINS (insertion internal to a segment) |

Figure 7:
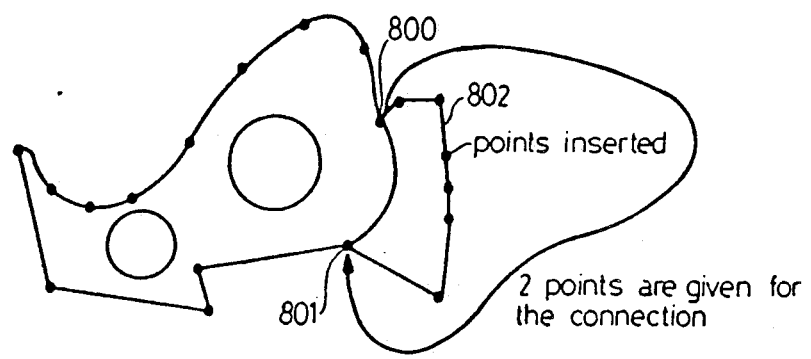
FIG. 7 shows an example of insertion of an element in accordance with the graphic software.

As shown in FIG. 7, the connection 800, 801 at which the insertion 802 is made is first identified and the contour to be inserted is given, using a procedure similar to the menu SEGPRM (however without symmetries).

| SEGMENT (Menu 8): Title SEGCNG (change and modification internal to a segment) | |
|---|---|
| 8.1. | Point (arcs and circles do not have characteristic points) |
| 8.2 | Color |
| 8.3. | Type (solid vs line) |
| 8.4. | Thickness (for lines only) |

That then constitutes the menus at the level of the segment.

An image being composed of segments, often of a substantial quantity (>200) the software is provided with more general tools than those occurring at the lowest level.

To do that, there are two graphic entities of equivalent hierarchial level:
  the group
  the classes.

GROUP: a group is unique and it is thereon that the positioning operations of the following type will be performed:
  rotation
  scales
  proportional scales
  translations
  copies
  change in colors The group is a dynamic entity which can be created and revoked at any time. It is the working entity (there is only one group at a time).

CLASS: There may be up to 64 thereof.

It is the static structuration tool and the memory of structuration, it is also possible to do logic sorting on that entity. For example SEGMENT (i) = {class (1), class (2), class (3)}

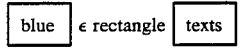

It is possible to go from

at any moment.

| GROUP: Menu 15: Title GRPDEF (definition of groups) | |
|---|---|
| 9.1. | The different segments to be put in the group are identified by digitization |
| 9.2. | Color: giving ε to the group all the segments of a given color |
| 9.3. | Rectangle: all the segments within a rectangle defined - by 2 point ε to the group |
| 9.4. | Exclusion: point a segment to be excluded from the group |
| 9.5. | Class: putting the ε of a class within a group. |

| CLASS Menu 16: Title CLADEF (definition of classes) | |
|---|---|
| 10.1. | Adopt: a group, a segment, another class to the current class |
| 10.2. | Exclude: |
| 10.3. | The cuurrent class is caused to flash |
| 10.4. | Class No. 1 is caused to flash |
| 10.5. | GROUP: a group becomes a class and a logic entity number is allocated thereto |
| 10.6. | Increment: the current class is abandoned. All the segments to come ε to the new class (logic number +1 of the preceding class). |

In addition to the structuration tools which facilitate the problems of identification and recognition of structure on the view of an image, there is a need for tools for positioning and processing of overlapping.

The positioning tools may be used in constant junction of 'GLUE POINTS' and 'GEOMOD'.

| POSITION Menu 1: Title TRANSF (transformer) | |
|---|---|
| 1.1. | Translate: starting point and finishing point are given |
| 1.2 | Translation: the translation is effected in real time |
| 1.3. | Scale |
| 1.4. | Proportional scale: the scales are indicated by a graphic method only namely: $P_F$ - fixed point, old point, new point - which ensures complete and easy checking upon transformation and authorizes the mirror effects in respect of disposition of points: equal distances obtained by GEOLON (for example) | x————//————x————//————x
old P              fixed P              new P

| 1.5 | Rotations: fixed point + GEOANG |

All the positioning operations can be applied both to segments and to groups, to apply then to classes, first do:

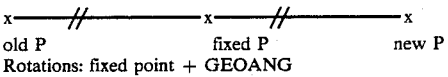

Management of overlappings (priority)
PRIORITY (Menu 1): Title OVERLAP

These transformations determine which part of the image changes; these transformations can be applied only to segments and groups.

| 1.1. All in front |
| 1.2. All behind |
| 1.3. After segment |
| 1.4. Before segment |
| 1.5. After group |
| 1.6. Before group |

There are more than 64000 levels of tracings to produce those transformations; those tracings, to simplify use, are never accessible nominatively (by number) but by relative value, as shown by the functions of the menu.

| COLORS (Menu 1) Title: COLOR (creation and definition of colors) (use color choice as SEGOL (for example)) |
|---|
| 1.1. Modify color |

-continued

| | | |
|---|---|---|
| 1.2. | Edit color | |
| 1.3. | Degrade | |
| 1.4. | Color mode | |
| 1.1. | : replace a color by another typically | |
| | (old number ⟶ new number) | |
| 1.2. | The color is edited in accordance with the color mode: RVB: red-green-blue mode CMY: cyan, magenta, yellow (printers mode) | |

| COPY (Menu 1): Title COPIES | |
|---|---|
| 1.1. | Copy |
| 1.2. | + |
| 1.3. | Translation |
| 1.4. | Rotation |
| 1.5. | Scaling |
| 1.6. | Logarithmic |
| 1.7. | Color |
| 1.8. | Color |
| 1.9. | Execute |

Image software

By virtue of their dimension the image data cannot be stored in a central memory but on Winchester discs.

Software: manages inputs-outputs between the central memory and the peripherals (Winchester disc, camera, cassette unit, memory and "video", etc . . . ) manages the central memory makes it possible to manipulate a number of images simultaneously makes it possible to write the programs in an advanced language.

Functions of the software image

* AQUISITION

Inclusion: The window of any shape in which is defined by its class of segments by means of graphic functions. The image is displaced manually under the objective lens of camera 4 and appears in semi-real time in the window.

Contouring: The image is positioned manually in the graphic image. By means of the graphic tablet 7, the operator selects the zone of the image that he wishes to retain. The remainder is eliminated.

COLOR

Modification in real time of the colors in mode R-V-B-.

Modification in real time of the colors in mode luminance/tint/saturation.

* PRINTING COLOR

This function adjusts the colors of the screen so that they are close to the printing colors. This function is a calibration function.

* TEXT

1. Thinning

Thinning by steps equivalent to one or more image elements.

2. Thickening

Thickening by equivalent to one or more image elements.

POSITIVE-NEGATIVE

Permits transformation of a positive into negative or viceversa.

SMOOTHING

Permits a reduction in the level of resolution of the image to correct defects such as pitting.

PSEUDO-RELIEF

Permits an increase in the high frequencies of the image: artificial contour effects.

We claim:

1. A system for creating images for use in printing wrappers that are to be placed on an article of manufacture, comprising a graphics console having a graphic tablet for tracing a drawing representative of a portion of a wrapper to be printed, computer means responsive to data obtained by said tracing operation for generating vectorial information representative of said wrapper portion, said graphics console including a monitor responsive to said vectorial information for producing a visible geometric figure image of said wrapper portion, video input means for scanning an object separate from said drawing and operative to generate video signals representative of additional information, means including said computer means for coupling information derived from said video signals to said monitor in combination with said vectorial information to produce a composite visual image of the wrapper consisting of the additional information derived from said video signals superimposed on the geometric figure image represented by said vectorial information derived from said graphic tablet, and manually operable input means coupled to said computer means for selectively modifying the appearance of said composite visual image on said monitor.

2. The system of claim 1 wherein said video input means is a reader scanner.

3. The system of claim 1 wherein said video input means is a video camera.

4. The system of claim 1 including means coupled to said computer for printing the visual image, which appears on said monitor, on a carrier.

5. The system of claim 4 wherein said carrier is paper.

6. The system of claim 4 wherein said carrier is graphic film.

* * * * *